United States Patent
Azzi et al.

(10) Patent No.: US 9,162,678 B2
(45) Date of Patent: Oct. 20, 2015

(54) METHOD FOR CONTROLLING A MEANS FOR RECOVERING ENERGY GENERATED BY THE BRAKING OF A MOTOR VEHICLE

(75) Inventors: Hamid Azzi, Maurepas (FR); Marc Lucea, Boulogne Billancourt (FR); Guillermo Pita-Gil, Montigny-le-bretonneux (FR)

(73) Assignee: RENAULT s.a.s., Boulogne-billancourt (FR)

( * ) Notice: Subject to any disclaimer, the term of this patent is extended or adjusted under 35 U.S.C. 154(b) by 8 days.

(21) Appl. No.: 13/981,226

(22) PCT Filed: Jan. 20, 2012

(86) PCT No.: PCT/FR2012/050120
§ 371 (c)(1),
(2), (4) Date: Sep. 27, 2013

(87) PCT Pub. No.: WO2012/101360
PCT Pub. Date: Aug. 2, 2012

(65) Prior Publication Data
US 2014/0012476 A1    Jan. 9, 2014

(30) Foreign Application Priority Data
Jan. 25, 2011    (FR) ..................... 11 00216

(51) Int. Cl.
*B60W 30/18* (2012.01)
*B60W 10/184* (2012.01)
(Continued)

(52) U.S. Cl.
CPC ............ *B60W 30/18127* (2013.01); *B60L 7/18* (2013.01); *B60L 7/26* (2013.01);
(Continued)

(58) Field of Classification Search
None
See application file for complete search history.

(56) References Cited

U.S. PATENT DOCUMENTS 5,283,507 A * 2/1994 Stitt et al. ...................... 318/376
5,345,358 A * 9/1994 Kumar ............................ 361/78
(Continued)

FOREIGN PATENT DOCUMENTS

| EP | 1 555 184 | 7/2005 |
| FR | 2 926 771 | 7/2009 |
| JP | 58 003502 | 1/1983 |

OTHER PUBLICATIONS

International Search Report Issued May 2, 2012 in PCT/FR12/050120 Filed Jan. 20, 2012.
(Continued)

*Primary Examiner* — Rami Khatib
*Assistant Examiner* — Jeffrey Boomer
(74) *Attorney, Agent, or Firm* — Oblon, McClelland, Maier & Neustadt, L.L.P.

(57) ABSTRACT

A method for controlling a motor vehicle including driven wheels, a mechanism recovering energy generated by braking, and a torque transmission chain transmitting torque from the driven wheels to the energy recovery mechanism, the method including:
a) acquiring a braking instruction and dynamic characteristics of the motor vehicle,
b) controlling the energy recovery according to a control set point calculated as a function of the braking instructions and the dynamic characteristics acquired in a), and c) controlling the brakes according to a control set point calculated as a function of the braking instruction and the dynamic characteristics acquired in a). In b), the control set point for energy recovery is calculated by a preventive filter that filters the braking instruction to attenuate amplitude thereof around the resonant frequency of the torque transmission chain.

11 Claims, 6 Drawing Sheets

(51) Int. Cl.
   *B60L 7/18*    (2006.01)
   *B60L 15/20*   (2006.01)
   *B60L 7/26*    (2006.01)

(52) U.S. Cl.
   CPC ............. *B60L 15/20* (2013.01); *B60W 10/184* (2013.01); *B60W 2510/18* (2013.01); *B60W 2540/12* (2013.01); *B60W 2710/18* (2013.01); *Y02T 10/7275* (2013.01)

(56) References Cited

U.S. PATENT DOCUMENTS

| | | | | |
|---|---|---|---|---|
| 5,514,050 | A * | 5/1996 | Bauerle et al. | 477/118 |
| 6,163,121 | A * | 12/2000 | Kumar et al. | 318/434 |
| 2003/0168266 | A1 * | 9/2003 | Sasaki et al. | 180/65.3 |
| 2003/0173826 | A1 * | 9/2003 | Tazoe et al. | 303/152 |
| 2004/0195914 | A1 * | 10/2004 | Beck et al. | 303/191 |
| 2005/0159871 | A1 | 7/2005 | Nakamura et al. | |
| 2005/0179316 | A1 * | 8/2005 | Tobler et al. | 303/113.1 |
| 2006/0087292 | A1 * | 4/2006 | Hsu et al. | 322/10 |
| 2010/0194322 | A1 * | 8/2010 | Negoro et al. | 318/454 |
| 2010/0292879 | A1 * | 11/2010 | Luedtke | 701/22 |
| 2011/0148184 | A1 * | 6/2011 | Suzuki et al. | 303/3 |
| 2011/0254475 | A1 * | 10/2011 | De Wergifosse | 318/380 |
| 2012/0033048 | A1 * | 2/2012 | Ogawa et al. | 348/46 |
| 2012/0187683 | A1 * | 7/2012 | Wohlleb | 290/44 |
| 2014/0214298 | A1 * | 7/2014 | Pita-Gil | 701/70 |
| 2015/0105951 | A1 * | 4/2015 | Yu et al. | 701/22 |

OTHER PUBLICATIONS

French Search Report issued Sep. 29, 2011 in FR 1100216 Filed Jan. 25, 2011.

* cited by examiner

Filter 1 (preventive filter)

Filter 2 (corrective filter)

(acceleration of the motor vehicle in time, after the driver has requested the braking of the vehicle, where the control system has no filter)

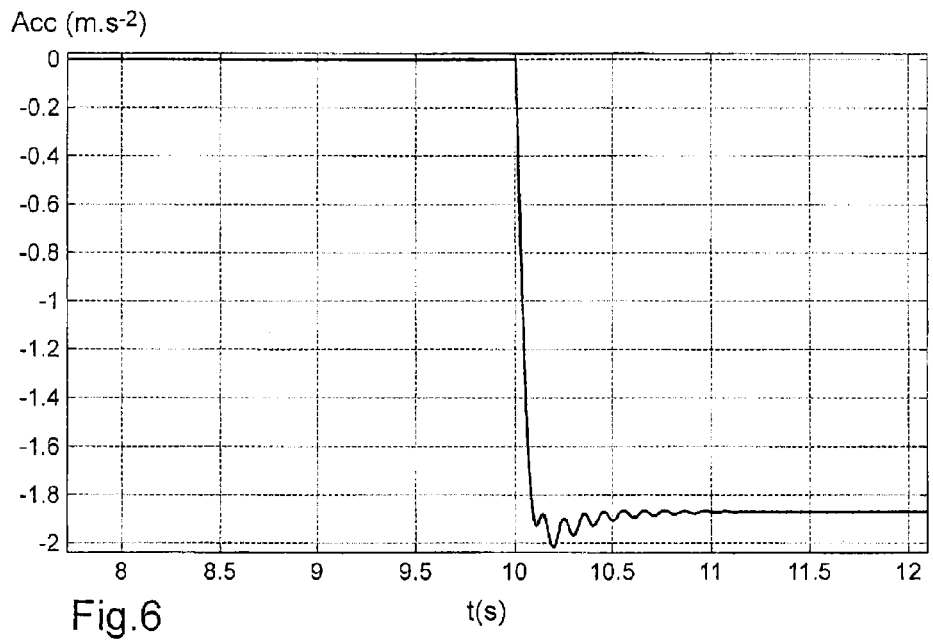

Fig.6

(acceleration of the motor vehicle in time, after the driver has requested the braking of the vehicle, where the control system is equipped with a low-pass preventive filter and a corrective filter)

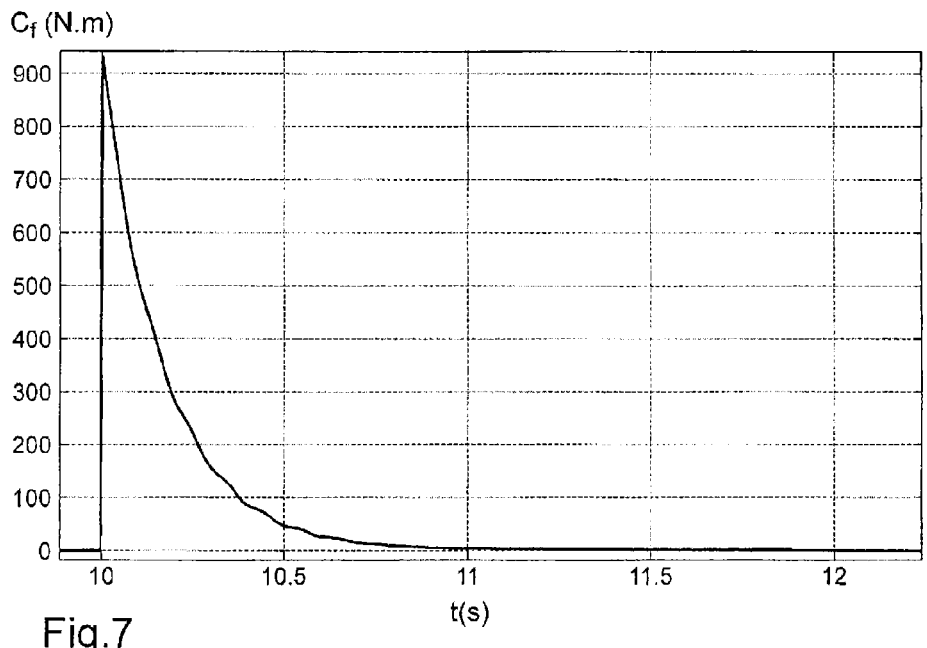

Fig.7

(brake control setpoint in time, after the driver has requested the braking of the vehicle, where the control system is equipped with a low-pass preventive filter and a corrective filter)

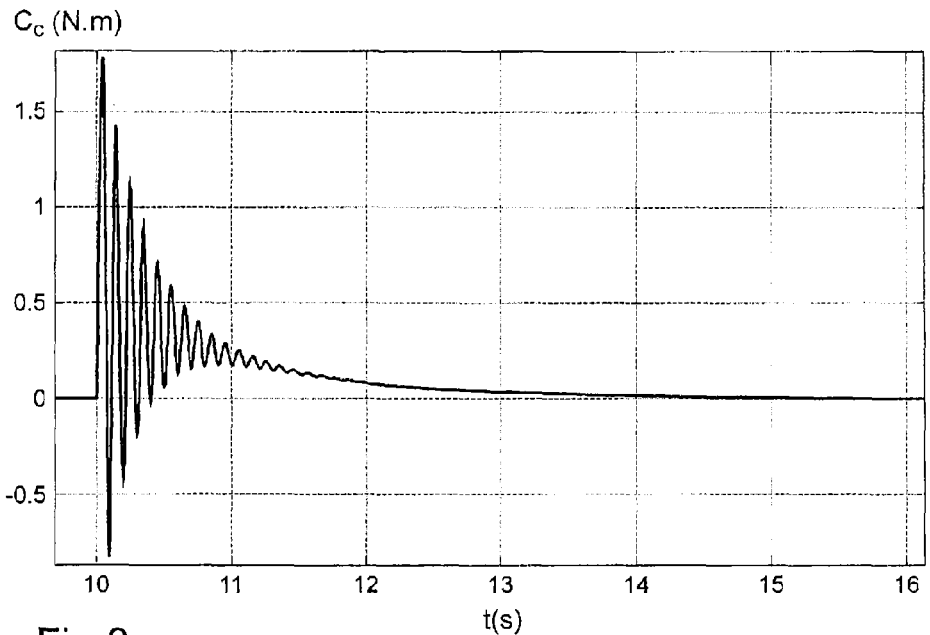

Fig.8
(component of the recovery means control setpoint in time, after the driver has requested the braking of the vehicle, where the control system is equipped with a low-pass preventive filter and a corrective filter)

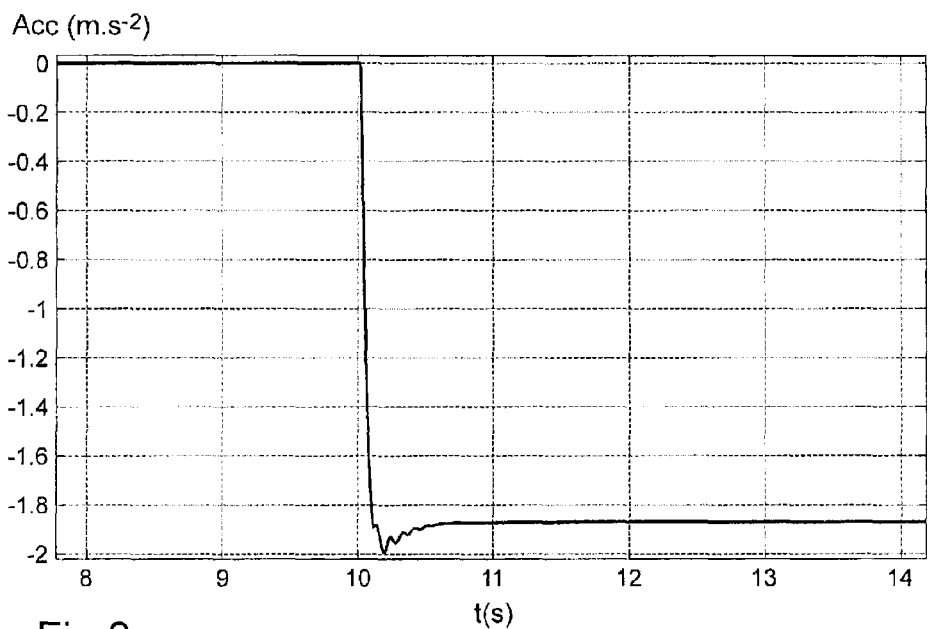

Fig.9
(acceleration of the motor vehicle in time, after the driver has requested the braking of the vehicle, where the control system is equipped with a low-pass preventive filter and a corrective filter, with simulation of a delay of 20 ms in the control system)

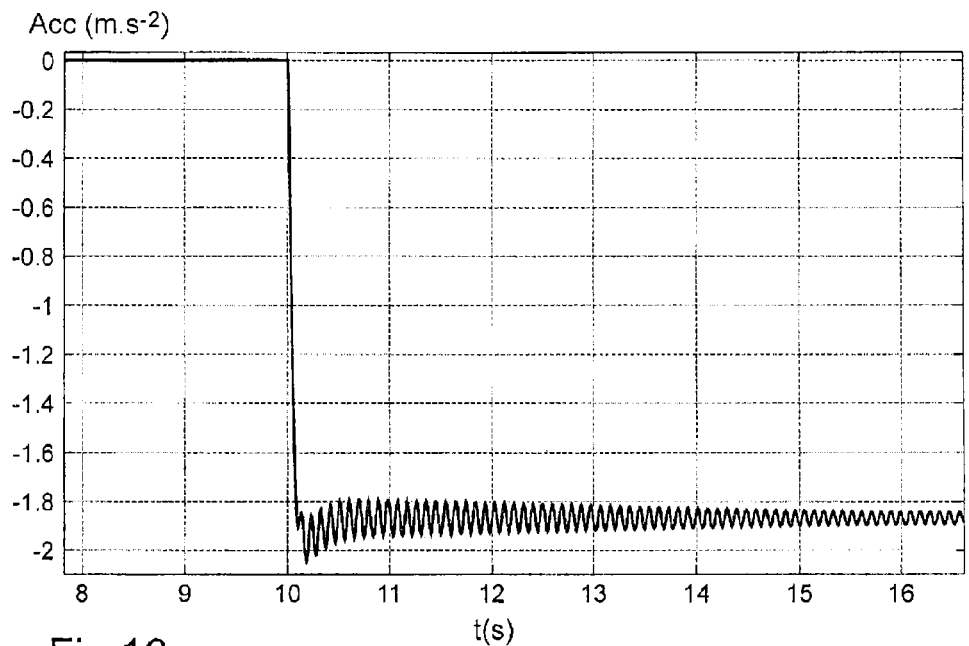

Fig.10
(acceleration of the motor vehicle in time, after the driver has requested the braking of the vehicle, where the control system is equipped with a single filter which is a low-pass preventive filter)

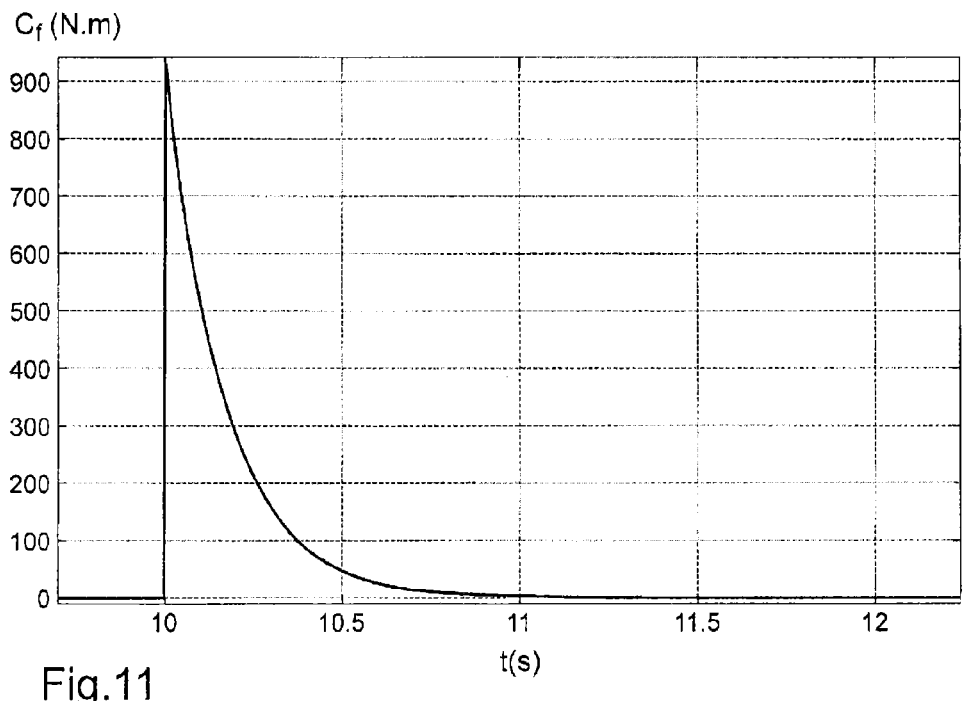

Fig.11
(brake control setpoint in time, after the driver has requested the braking of the vehicle, where the control system is equipped with a single filter which is a low-pass preventive filter)

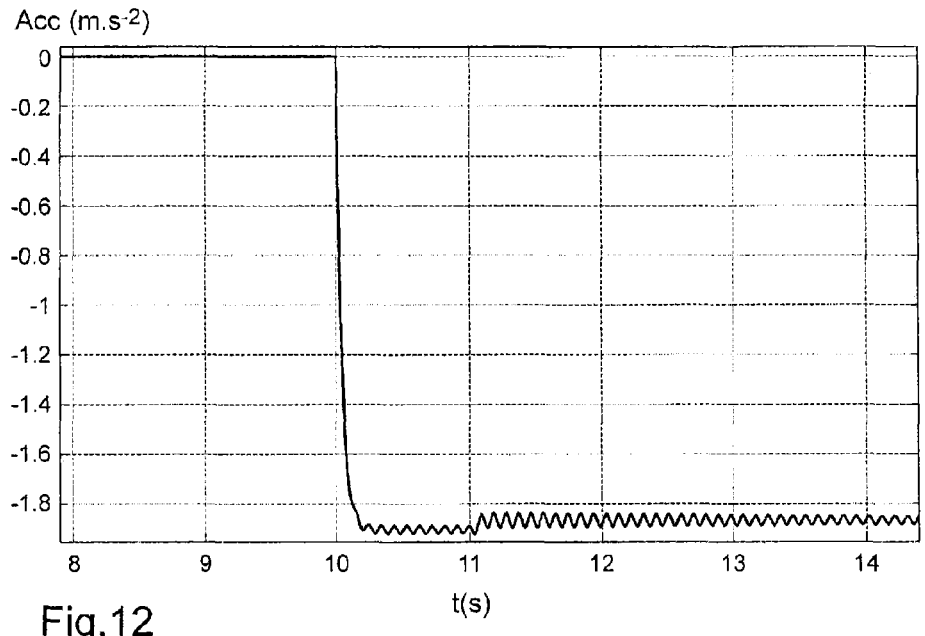

Fig.12

(acceleration of the motor vehicle in time, after the driver has requested the braking of the vehicle, where the control system is equipped with a single filter which is a preventive saturation filter)

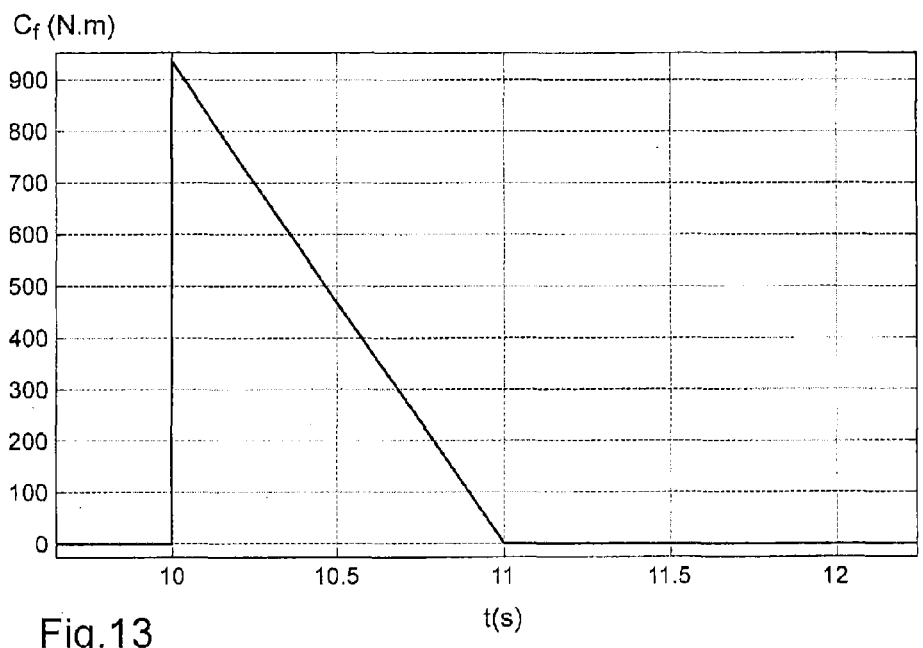

Fig.13

(brake control setpoint in time, after the driver has requested the braking of the vehicle, where the control system is equipped with a single filter which is a preventive saturation filter)

METHOD FOR CONTROLLING A MEANS FOR RECOVERING ENERGY GENERATED BY THE BRAKING OF A MOTOR VEHICLE

TECHNICAL FIELD TO WHICH THE INVENTION RELATES

The present invention relates in a general way to the control of braking members of a motor vehicle.

It is applicable to motor vehicles having driven wheels, brakes, a means for recovering energy generated by the braking of the motor vehicle, and a torque transmission mechanism transmitting torque from the driven wheels to the recovery means.

More specifically, it relates to a method for controlling a motor vehicle of this type, comprising the steps of:
a) acquiring a braking instruction and dynamic characteristics of the motor vehicle (speed, acceleration, angular speed of the wheels, engine speed, etc.),
b) controlling said recovery means according to a control setpoint calculated as a function of the braking instruction and of the dynamic characteristics acquired in step a), and
c) controlling the brakes according to a control setpoint calculated as a function of the braking instruction and of the dynamic characteristics acquired in step a).

TECHNICAL BACKGROUND

In motor vehicles of the aforesaid type, the recovery means is provided in addition to the brakes. Thus it can be used not only to brake the vehicle, but also to store some of the energy generated by the braking of the vehicle for subsequent re-use.

This recovery means therefore makes it possible to reduce the energy consumption of the vehicle as well as the wear on the brake pads.

Unfortunately, when braking takes place in this type of vehicle, phenomena of oscillation of the torque transmitted to the driven wheels are observable, resulting in jerking, affecting passenger comfort, and wear on the members of the traction mechanism of the vehicle.

These oscillations arise from the torque transmission mechanism, which, because each of its members has non-zero rigidity and damping, is deformed (by torsion, flexion, traction and compression) with an amplitude and frequency which vary as a function of the transmitted torque and the ageing of the various components.

OBJECT OF THE INVENTION

In order to reduce the jerking which affects the comfort of the passengers in the vehicle, the present invention proposes to filter (in the wider sense of the word) the braking instruction sent by the driver.

More specifically, according to the invention a control method is proposed, as defined in the introduction, wherein, in step b), the control setpoint of said recovery means is calculated by means of a preventive filter which filters said braking instruction in such a way as to attenuate the amplitude thereof, particularly around the resonant frequency of the torque transmission mechanism.

When the frequency behavior of the torque transmission mechanism is studied, it can be seen that this torque transmission mechanism has a main resonant frequency which gives rise to the jerking.

As a result of the invention, the control setpoint of the recovery means is calculated in such a way that the torque transmission mechanism is not excited, or is only excited to a small degree, at frequencies close to this resonant frequency.

In this way, the jerking experienced by passengers during the braking of the vehicle is greatly reduced.

Other advantageous and non-limiting characteristics of the control method according to the invention are as follows:
in step a), the value of an output parameter of said recovery means is acquired, and, in step b), the control setpoint of this recovery means is calculated by means of a corrective filter which filters said output parameter in such a way as to damp out the oscillations of the torque transmission mechanism;
the recovery means being an electric motor, and said output parameter being the operating speed of the electric motor;
the corrective filter is of the form $$\frac{Ks^2(1 + \tau_1 s)}{(1 + \tau_2 s)^2(1 + \tau_2 s)};$$

the preventive filter is a low-pass filter;
the preventive filter is a signal saturation filter;
in step c), the brake control setpoint is deduced from the difference between the braking instruction and the recovery means control setpoint;
in step a), the braking instruction is determined as a function of the position of the brake pedal of the motor vehicle or of the force applied to this brake pedal or of the derivative of the position of the brake pedal or of the derivative of the force applied to this brake pedal.

The invention also relates to a motor vehicle as defined in the introduction, which has a control unit programmed to execute a control method as mentioned above.

Advantageously, in this case, said recovery means takes the form of an electric motor.

DETAILED DESCRIPTION OF AN EXEMPLARY EMBODIMENT

The following description, with reference to the attached drawings, provided by way of non-limiting example, will enable the reader to understand the nature of the invention and the way in which it can be applied.

In the attached drawings:

FIG. 6 is a curve representing the variations of the acceleration of the motor vehicle in time, after the driver has requested the braking of the vehicle, where the control system is equipped with a low-pass preventive filter and a corrective filter;

FIG. 7 is a curve representing the variations of the brake control setpoint in the same conditions as those described for FIG. 6;

FIG. 8 is a curve representing the variations of one of the two components of the recovery means control setpoint, namely that obtained from the corrective filter, in the same conditions as those described for FIG. 6;

FIG. 9 is a curve representing the variations of the acceleration of the motor vehicle in time, in the same conditions as those described for FIG. 6, but with the simulation of a delay of 20 ms in the control system;

FIG. 10 is a curve representing the variations of the acceleration of the motor vehicle in time, after the driver has requested the braking of the vehicle, where the control system is equipped with a single filter which is a low-pass preventive filter;

FIG. 11 is a curve representing the variations of the brake control setpoint in the same conditions as those described for FIG. 10;

FIG. 12 is a curve representing the variations of the acceleration of the motor vehicle in time, after the driver has requested the braking of the vehicle, where the control system is equipped with a single filter which is a preventive saturation filter; and FIG. 13 is a curve representing the variations of the brake control setpoint in the same conditions as those described for FIG. 12.

FIG. 1 shows in a highly schematic way a motor vehicle 1.

Figure 1:
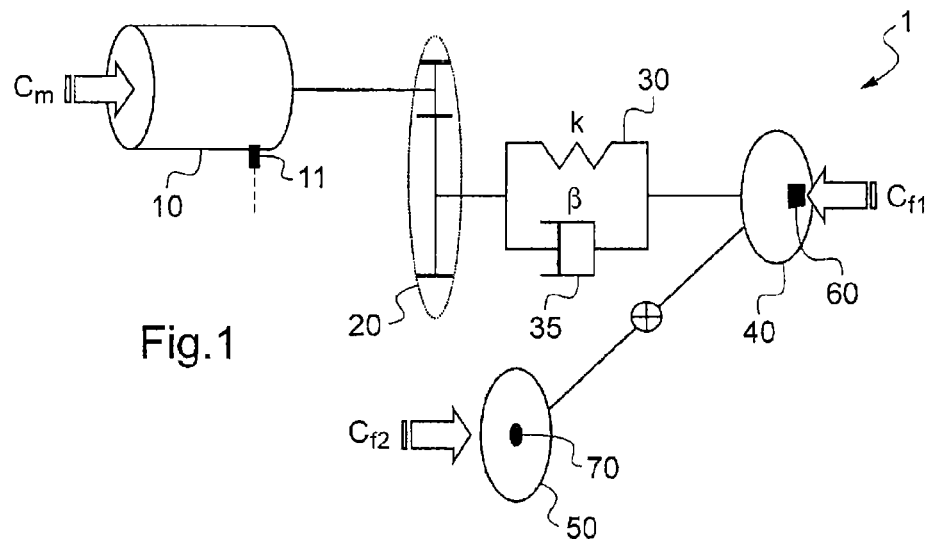
FIG. 1 is a schematic view of the motor vehicle according to the invention.

This motor vehicle includes, in a conventional way, two driven wheels 40 (illustrated in FIG. 1 by a single circle) and two non-driven wheels 50 (illustrated in FIG. 1 by another circle).

In this case, the motor vehicle 1 is an electric vehicle. It therefore includes a bank of accumulators (not shown), an electric motor 10 supplied by this bank of accumulators, and a torque transmission mechanism 20 transmitting the torque from the motor 10 to the driven wheels 40, comprising, in particular, a gearing mechanism.

As shown schematically in FIG. 1, this transmission mechanism 20 has a non-zero elasticity which can be modeled by a spring 30 having a rigidity denoted by k, and by a damping piston 35 denoted by β.

This transmission mechanism 20 is thus capable of being deformed (by torsion, flexion, traction and compression) and of oscillating at a frequency and with an amplitude which vary as a function of the torque transmitted from the electric motor 10 to the driven wheels 40 or from the driven wheels 40 to the electric motor 10. A study of this transmission mechanism will reveal that it has a fundamental mode around which it is capable of oscillating strongly, at a frequency called the resonant frequency.

The motor vehicle 1 also includes two types of braking means, namely dissipative braking means and a recovery braking means (also called an "energy recovery means").

The dissipative braking means in this case are disk brakes 60, 70 which are fitted to the trains of driven wheels 40 and non-driven wheels 50. In variants, these means could evidently be drum brakes.

The recovery braking means in this case is formed by the electric motor 10 itself, which then serves as an alternator, in the sense that it is adapted to brake the driven wheels 40 when the vehicle advances and to convert the kinetic energy of the vehicle to electrical energy supplied to the bank of accumulators.

To control its various members, the motor vehicle 1 has a computer comprising a processor (CPU), a random access memory (RAM), a read-only memory (ROM) and various input and output interfaces.

By means of its input interfaces, the computer is adapted to receive input signals sent from various sensors 11, 81. In particular, it is adapted to acquire the rotation speed $\omega_m$ of the electric motor 10 by means of a speed sensor 11, and to acquire the position and pressure of the brake pedal 80 (FIG. 2) by means of a sensor 81.

Figure 2:
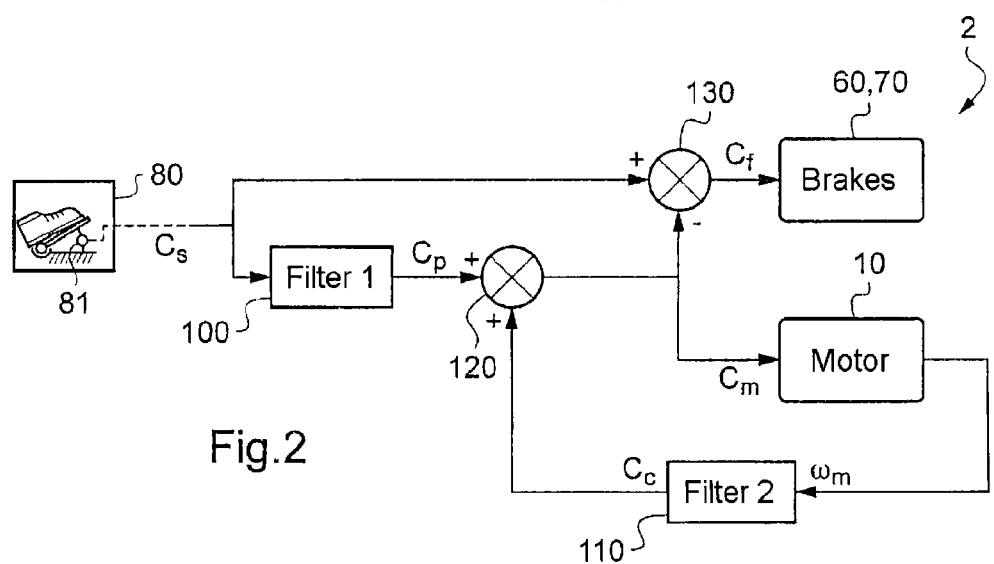
FIG. 2 is a diagram illustrating the control system for controlling the brakes and the energy recovery means of the motor vehicle of FIG. 1.

By means of software 2 installed in its read-only memory and illustrated schematically in FIG. 2, the computer is adapted to calculate, for each operating condition of the motor vehicle 1, control setpoints for the electric motor 10 and the brakes 60, 70.

Finally, by means of its output interfaces, the computer is adapted to transmit these control setpoints to the electric motor 10 and to the brakes 60, 70.

When the driver depresses the brake pedal 80, the computer is adapted to execute a method for controlling the electric motor 10 and the brakes 60, 70, which is composed of six main operations, shown in FIG. 2.

The first operation is a data acquisition operation.

During this operation, the computer acquires the instantaneous position of the brake pedal 80, the instantaneous pressure exerted thereon, and the instantaneous rotation speed $\omega_m$ of the electric motor 10.

The second operation is an operation of determining the intensity with which the driver wishes to brake the motor vehicle 1.

During this operation, the computer deduces, from the position of the brake pedal 80 and the pressure exerted thereon, the value of the braking torque Cs desired by the driver.

This desired braking torque Cs therefore corresponds to the sum of the braking torques to be applied to the driven wheels 40 and non-driven wheels 50 of the motor vehicle 1 by means of the brakes 60, 70 and the electric motor 10.

The third operation, which is at the heart of the present invention, is an operation of filtering this desired braking torque Cs.

During this operation, the computer calculates the value of a first intermediate torque Cp, by means of a preventive filter 100 which filters the desired braking torque Cs so as to attenuate its amplitude around the resonant frequency of the torque transmission mechanism 20.

Thus this preventive filter 100 enables the control setpoint for the electric motor 10 to be filtered so as to prevent the latter from excessively exciting the fundamental mode of the torque transmission mechanism 20.

Figure 5:
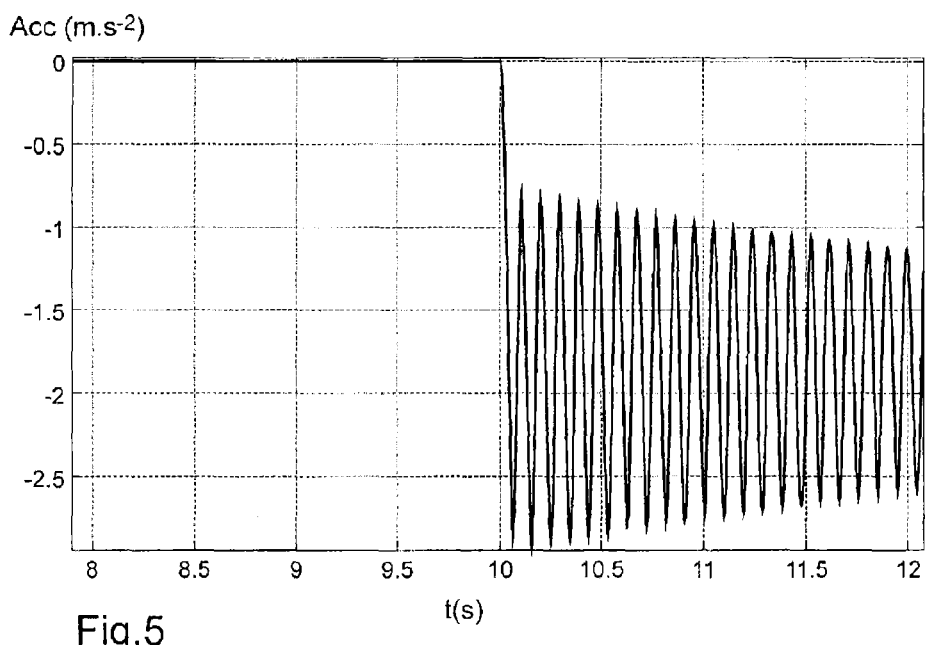
FIG. 5 is a curve representing the variations of the acceleration of the motor vehicle in time, after the driver has requested the braking of the vehicle, where the control system has no filter.

FIG. 5 shows the variations of longitudinal acceleration which the motor vehicle 1 would have in the absence of this filtering, if the driver depressed the brake suddenly and kept it pressed down.

It can be seen in this figure that the longitudinal acceleration of the vehicle would oscillate strongly and over a long period, which would generate jerking that would affect the comfort of the passengers in the vehicle.

The advantage of this preventive filter 100 is therefore that it decreases the occurrence of these oscillations.

Figure 3:
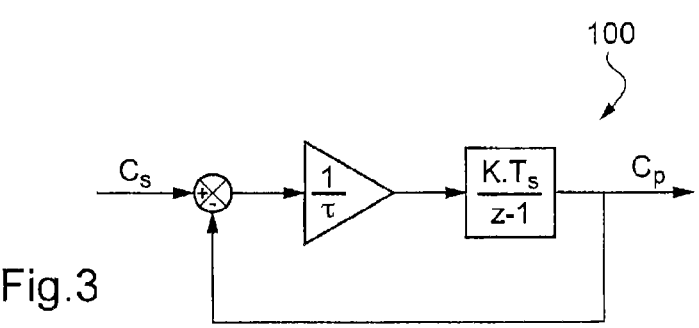
FIG. 3 is a diagram illustrating the preventive filter of the control system of FIG. 2.

As shown in FIG. 3, this preventive filter 100 is a low-pass filter whose cutoff frequency (equal to 1/τ) is chosen as a function of the main resonant frequency of the torque transmission mechanism 20. Delay is determined as a function of the imaginary variable z, a constant K, an a sampling interval $T_s$, where $K.T_s$ is the dot product of K and $T_s$.

The fourth operation, which substantially improves the operation of the present invention, is an operation of damping the oscillations of the torque transmission mechanism 20. It is carried out by measuring the instantaneous rotation speed $\omega_m$ of the electric motor and by controlling this electric motor 10 as a function of the variations of this rotation speed $\omega_m$. This operation could also take the rotation speed of the wheels into consideration.

During this operation, the computer calculates the value of a second intermediate torque Cc, by means of a corrective filter 110 which filters the variations of the rotation speed $\omega_m$ of the electric motor 10 so as to take the behavior of this electric motor 10 into consideration in real time, in order to provide the best damping of the oscillations of the torque transmission mechanism 20.

Figure 4:
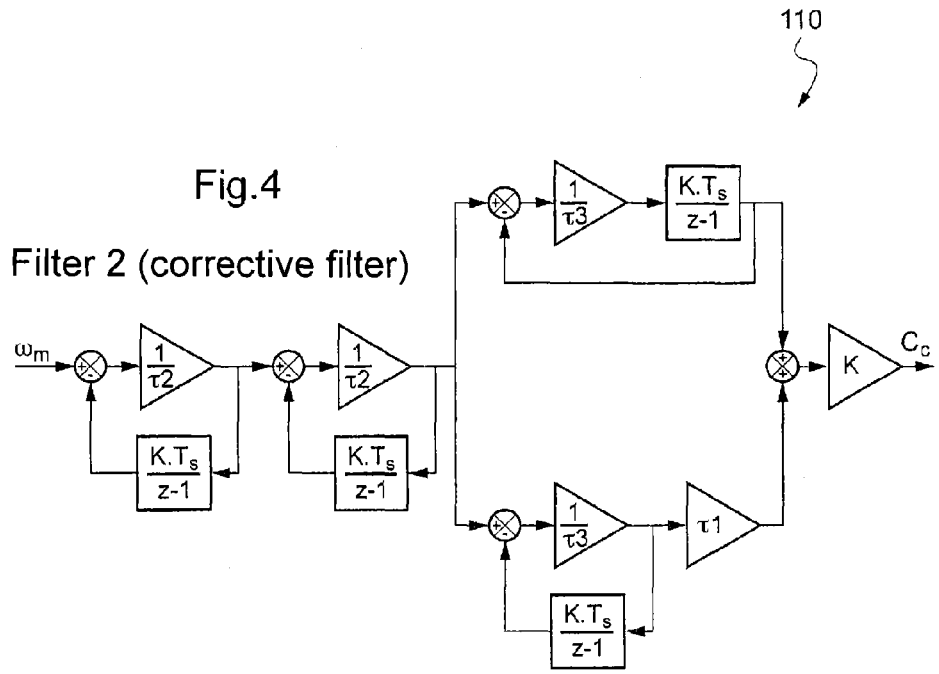
FIG. 4 is a diagram illustrating the corrective filter of the control system of FIG. 2.

As shown in FIG. 4, the corrective filter 110 in this case takes the form $$\frac{Ks^2(1+\tau_1 s)}{(1+\tau_2 s)^2(1+\tau_2 s)}.$$

Thus the corrective filter 110 includes a double derivative. In this way, when the pressure on the brake pedal 80 is maintained, the braking initially provided by the brakes 60, 70 is rapidly switched to the electric motor 10, which then becomes solely responsible for the braking of the motor vehicle 1. It is thus possible to recover a maximum amount of electrical energy, although this is subject to the capacity of the electric motor 10 to brake the vehicle. Various time constants may include a first time constant $\tau 1$, a second time constant $\tau 2$, and a third time constant $\tau 3$ Alternatively, the corrective filter may be described in terms of a variable s.

The corrective filter 110 also includes a pole-zero pair. Thus the control system has low sensitivity to any delays which may be caused by an offset between the moment at which the position of the brake pedal 80 and the rotation speed $\omega_m$ of the electric motor 10 are measured and the moment at which the electric motor 10 is controlled as a function of these measured data.

The fifth operation is an operation of generating a control setpoint Cm for the electric motor 10.

This operation is carried out with the aid of an adder 120 which calculates the sum of the two intermediate torques Cc, Cp, thus providing the control setpoint torque Cm for the electric motor 10.

The sixth operation is an operation of generating a control setpoint Cf for the brakes 60, 70.

This operation is carried out with the aid of a subtractor 130 which calculates the difference between the desired braking torque Cs and the control setpoint torque Cm for the electric motor 10, thus providing the control setpoint torque Cf for the brakes 60, 70. Thus this calculation enables the brakes to be controlled in such a way that they become responsible for providing the part of the braking torque that cannot be provided by the electric motor 10.

The control setpoint torque Cf is then distributed between the brakes 60, 70 of the two trains of driven wheels 40 and non-driven wheels 50 according to a predetermined distribution of the form:

$Cf=a.Cf1+(1-a).Cf2$, where a is a predetermined constant, but its value can change from one vehicle to another vehicle,
Cf1 is the part of the control setpoint torque Cf transmitted to the brakes 60 of the driven wheels 40,
Cf2 is the part of the control setpoint torque Cf transmitted to the brakes 70 of the non-driven wheels 50,
  a.Cf1 is the dot product between a and Cf1, and
  (1-a). is the dot product between (1-a) and Cf2.

FIGS. 6 to 9 show the results obtained when the driver depresses the brake suddenly and keeps it pressed down.

FIG. 6 shows the variations of the longitudinal acceleration of the motor vehicle.

By comparison with FIG. 5, it can be seen in this FIG. 6 that the oscillations of the longitudinal acceleration of the vehicle not only have a lower amplitude, but are also better damped over time.

FIG. 7 shows the variations of the control setpoint torque Cf of the brakes 60, 70.

It can be seen that the setpoint torque decreases very rapidly and is cancelled in about 1 second, so that the electric motor 10 very rapidly becomes solely responsible for the braking of the motor vehicle. The amount of electrical energy recovered is thus maximized.

FIG. 8 shows the variations of the second intermediate torque Cc.

It can thus be seen that the component of the control setpoint torque Cm of the electric motor 10 which corresponds to this second intermediate torque Cc is calculated by means of the corrective filter 110, so as to oscillate in antiphase with the oscillations naturally generated by the electric motor 10 in the torque transmission mechanism 20.

FIG. 9 shows the variations of the longitudinal acceleration of the motor vehicle, taking into consideration a delay of 20 ms between the moment at which the position of the brake pedal 80 and the rotation speed $\omega_m$ of the electric motor 10 are measured and the moment at which the electric motor 10 is controlled as a function of these measured data.

It will be seen in this figure that this delay does not substantially modify either the amplitude or the damping of the oscillations of the longitudinal acceleration of the motor vehicle.

The present invention is not in any way limited to the embodiment described and illustrated, and a person skilled in the art will be able to create variants thereof in accordance with the spirit of the invention.

In a first variant, the system for controlling the electric motor 10 and the brakes 60, 70 may be arranged in such a way as to have no corrective filter, in which case the desired braking torque Cs will be filtered only by the preventive filter 110 before being transmitted to the electric motor 10. The electric motor 10 will therefore be controlled according to a control setpoint equal to the first intermediate torque Cp.

FIGS. 10 to 11 show the results obtained with a control system of this type when the driver depresses the brake 80 suddenly and keeps it pressed down.

FIG. 10 shows the variations of the longitudinal acceleration of the motor vehicle.

By comparison with FIG. 6, it can be seen in this FIG. 10 that the oscillations of the longitudinal acceleration of the vehicle still have a lower amplitude. However, in the absence of a corrective filter 120 they are less well damped.

FIG. 11 shows the variations of the control setpoint torque Cf of the brakes 60, 70.

Here again, it can be seen that the setpoint torque Cf decreases very rapidly and is cancelled in about 1 second, so that the electric motor 10 very rapidly becomes solely responsible for the braking of the motor vehicle 1.

To summarize, the use of a single (preventive) filter makes it possible to reduce the intensity of the jerking experienced by the passengers in the motor vehicle 1 and to optimize the use of the electric motor 10 for braking the vehicle. However, it does not enable the jerking to be damped very rapidly.

Additionally, the major drawback of this solution is that it requires the use of a cutoff frequency for the low-pass filter which is very low relative to the resonant frequency (lower than if the control system had a corrective filter), thereby further reducing the effectiveness of the oscillation damping.

In a second variant, the system for controlling the electric motor 10 and the brakes 60, 70 may be arranged in such a way that it has no corrective filter, while its preventive filter is not a low-pass filter but is what is known as a signal derivative limiting filter.

A filter of this type (not shown) can be used to limit the frequency variations of the braking instruction Cs when this frequency exceeds a predetermined maximum threshold and/or falls below a predetermined minimum threshold.

FIGS. 12 to 13 show the results obtained with a filter of this type when the driver depresses the brake suddenly and keeps it pressed down.

FIG. 12 shows the variations of the longitudinal acceleration of the motor vehicle.

By comparison with FIG. 10, it can be seen in this FIG. 12 that the oscillations of the longitudinal acceleration of the vehicle have an even lower amplitude, but are still relatively poorly damped.

FIG. 13 shows the variations of the control setpoint torque Cf of the brakes 60, 70.

By comparison with FIG. 11, it can be seen that the setpoint torque Cf decreases slightly less rapidly. Here again, however, it is cancelled in about 1 second, so that the electric motor 10 rapidly becomes solely responsible for the braking of the motor vehicle.

To summarize, in this second variant, the jerking experienced by the passengers is weaker than in the first variant, but the amount of energy recovered by the electric motor 10 is lower.

According to another variant, it would be possible to provide for the use of a corrective filter such as that shown in FIG. 4, in addition to the limiting filter.

In another variant, it would be possible to provide for the replacement of the brake pedal position sensor with a force sensor, in which case the desired braking torque Cs would be deduced from the force measured by this sensor.

It would also be possible to provide for the installation of the invention in a hybrid vehicle, in which case its operation would remain unchanged.

It would also be possible to provide for the installation of the invention in a conventional vehicle propelled by an internal combustion engine only. In this variant, the means of recovering the energy generated by the braking of the vehicle would take the form of an ad hoc member, such as an alternator, a pneumatic or mechanical means, or a hydraulic means.

The invention claimed is:

1. A method for controlling a motor vehicle including driven wheels, brakes, a means for recovering energy generated by braking, and a torque transmission mechanism transmitting torque from the driven wheels to the energy recovery means, the method comprising:
    a) acquiring a braking instruction and at least one dynamic characteristic of the motor vehicle;
    b) controlling the energy recovery mechanism according to a recovery control setpoint calculated as a first function of the braking instruction and of the at least one dynamic characteristic acquired in a); and
    c) controlling the brakes according to a braking control setpoint calculated as a second function of the braking instruction and of the at least one dynamic characteristic acquired in a),
    wherein in a), a value of an output parameter of the energy recovery mechanism is acquired, and
    wherein in b), the recovery control setpoint of the energy recovery mechanism is calculated by a preventive filter which filters the braking instruction to attenuate an amplitude of the braking instruction around a resonant frequency of the torque transmission mechanism, and the recovery control setpoint of the energy recovery mechanism is further calculated by a corrective filter which filters the output parameter to damp out oscillations of the torque transmission mechanism.

2. The control method as claimed in claim 1, wherein the energy recovery mechanism is an electric motor, and the output parameter is an operating speed of the electric motor.

3. The control method as claimed in claim 1, wherein the corrective filter takes a form $$\frac{Ks^2(1+\tau_1 s)}{(1+\tau_2 s)^2(1+\tau_2 s)},$$

wherein K is a predetermined constant,
s is a variable of the corrective filter,
$\tau_1$ is a first time constant, and
$\tau_2$ is a second time constant.

4. The control method as claimed in claim 1, wherein the preventive filter is a low-pass filter.

5. The control method as claimed in claim 1, wherein the preventive filter is a filter which saturates a derivative of a signal.

6. The control method as claimed in claim 1, wherein, in c), the braking control setpoint of the brakes is further deduced from a difference between the braking instruction and the recovery control setpoint of the energy recovery mechanism.

7. The control method as claimed in claim 1, wherein, in a), the braking instruction is determined as a function of a position of a brake pedal of the motor vehicle or as a function of a force applied to the brake pedal or as a function of a derivative of the position of the brake pedal or as a derivative of the force applied to the brake pedal.

8. A motor vehicle comprising:
    driven wheels;
    brakes;
    an energy recover mechanism recovering energy generated by the braking of the motor vehicle;
    a torque transmission mechanism transmitting torque from the driven wheels to the energy recovery mechanism; and
    a control unit programmed to execute a control method as claimed in claim 1.

9. The motor vehicle as claimed in claim 8, wherein the energy recovery mechanism is an electric motor.

10. A method for controlling a motor vehicle including drive wheels, brakes, an energy recovery mechanism that recovers kinetic energy and stores the recovered energy for later use by the motor vehicle, and a torque transmission mechanism that transmits torque from driven wheels to the energy recovery mechanism, the method comprising:
    (1) acquiring, by a computer,
        an instantaneous position of a brake pedal,
        an instantaneous pressure exerted on the brake pedal, and
        an instantaneous rotation speed of the energy recovery mechanism;
    (2) determining, by a computer, an intensity of a desired braking torque of the motor vehicle by deducing an intensity of the desired braking from the instantaneous position of the brake pedal and the instantaneous pressure exerted on the brake pedal;

(3) filtering, by a computer, the desired braking torque, including determining a value of a first intermediate torque by a preventative filter that filters the desired braking torque so as to attenuate the amplitude of the desired braking torque around a resonant frequency of the torque transmission mechanism;

(4) damping, by a computer, oscillations of the torque transmission mechanism by controlling the instantaneous rotation speed of the energy recovery mechanism as a function of variations of the instantaneous rotation speed of the energy recover mechanism, including determining a value of a second intermediate torque by a corrective filter that filters the variations of the instantaneous rotation speed of the energy recover mechanism;

(5) generating, by a computer, a recovery control setpoint torque for the energy recovery mechanism by calculating a sum of the first and second intermediate torques; and (6) generating, by a computer, a brake control setpoint torque for the brakes by calculating a difference between the desired braking torque and the recovery control setpoint torque.

11. A method for controlling a motor vehicle including driven wheels, brakes, a means for recovering energy generated by braking, and a torque transmission mechanism transmitting torque form the driven wheels to the energy recover means, the method comprising:

a) acquiring a braking instruction and at least one dynamic characteristic of the motor vehicle;

b) controlling the energy recovery means according to a recovery control setpoint calculated as a first function of the braking instruction and of the at least one dynamic characteristic acquired in a); and c) controlling the brakes according to a braking control setpoint calculated as a second function of the braking instruction and of the at least one dynamic characteristic acquired in a), wherein in a), a value of an output parameter of the energy recovery means is acquired, and wherein in b), the recovery control setpoint of the energy recovery means is calculated by a preventative filter which filters the braking instruction to attenuate an amplitude of the braking instruction around a resonant frequency of the torque transmission mechanism, and the recovery control setpoint of the energy recovery means is further calculated by a corrective filter which filters the output parameter to damp out oscillations of the torque transmission mechanism.

* * * * *